United States Patent [19]

Goings

[11] Patent Number: 5,894,207
[45] Date of Patent: Apr. 13, 1999

[54] METHOD AND APPARATUS FOR CONTROLLING A SEAT POSITION MOTOR AND A SEAT HEATER

[75] Inventor: James R. Goings, Novi, Mich.

[73] Assignee: TRW Inc., Lyndhurst, Ohio

[21] Appl. No.: 08/645,831

[22] Filed: May 14, 1996

[51] Int. Cl.[6] .................................................. G05B 5/00
[52] U.S. Cl. ................................................................ 318/478
[58] Field of Search ............................ 318/280, 281, 318/282, 283, 284, 285, 286, 101, 102, 103, 104, 471; 307/10.1, 11, 12, 38, 42; 219/202; 701/49

[56] References Cited

U.S. PATENT DOCUMENTS 5,004,967  4/1991  Ogasawara .................. 318/568.1
5,523,664  6/1996  Ogasawara .................. 318/590

*Primary Examiner*—William M. Shoop, Jr.
*Assistant Examiner*—Kim Lockett
*Attorney, Agent, or Firm*—Tarolli, Sundheim, Covell, Tummino & Szabo

[57] ABSTRACT

An apparatus (20) controls a seat positioning motor (32) and a seat heater (44) of an occupant seat (22). The apparatus includes common switches (62, 70) electrically connected to both the motor (32) and the seat heater (44). The common switches permits connection of the motor and the seat heater to a source of electric energy (B+). A controller (38) is connected to the common switches for selectively controlling actuation of the motor and the seat heater through the common switches.

9 Claims, 1 Drawing Sheet

METHOD AND APPARATUS FOR CONTROLLING A SEAT POSITION MOTOR AND A SEAT HEATER

TECHNICAL FIELD

The present invention is directed to a vehicle occupant seat electrical control system and is particularly directed to a method and apparatus for selectively controlling actuation of a seat positioning motor and an occupant seat heater.

BACKGROUND OF THE INVENTION

Vehicle occupant seat positioning systems that include motors to adjust the seat position are known in the art. Typically, each seat has associated electrical control switches, an electronic control module and an H-bridge motor relay driver to control the direction of movement of the associated seat positioning motor.

Occupant seat heating systems that include resistive heating elements mounted in the seat bottom cushion are known in the art. An electrical switch and associated relay are used to control actuation of the seat heater.

Known occupant seats that have position control motors and heating elements use separate control modules and control relays for each control feature. It is desirable to reduce the total number of electrical components associated with each vehicle occupant seat.

SUMMARY OF THE INVENTION

The present invention provides a method and apparatus for selectively controlling a seat positioning motor and a seat heater using shared or common electrical switching components.

In accordance with one embodiment of the present invention, an apparatus is provided for controlling a seat positioning motor and a seat heater associated with an occupant seat. The apparatus comprises common switching means electrically connected to both the motor and the seat heater. The common switching means permits connection of the motor and the seat heater to a source of electrical energy. The apparatus includes control means controllably connected to the common switching means for selectively controlling actuation of the motor and the seat heater through the common switching means.

In accordance with another embodiment of the present invention, a method is provided for controlling a seat position motor and a seat heater of the seat including the steps of providing common switching means to permit connection of the motor and the seat heater to a source of electrical energy and actuating said common switching means for selectively controlling actuation of both of the motor and the seat heater using the common switching means.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENT

Figure 1:
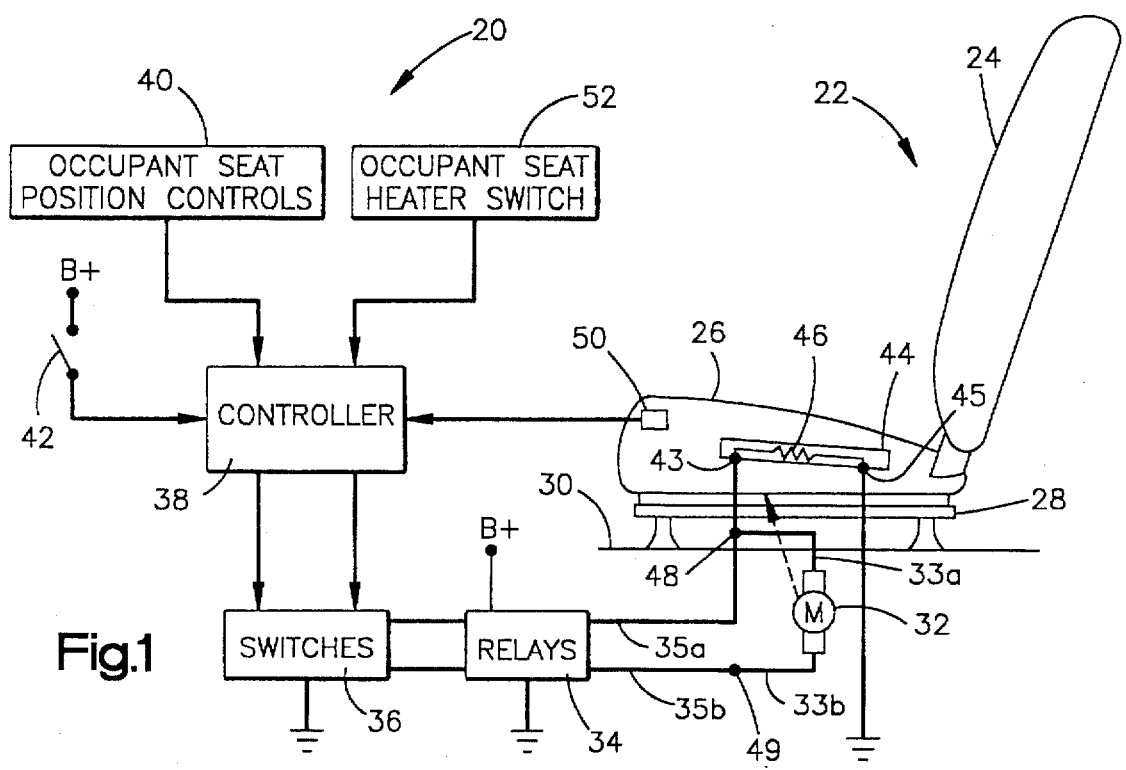
FIG. 1 is a schematic diagram of an occupant seat control system made in accordance with the present invention.
Figure 2:
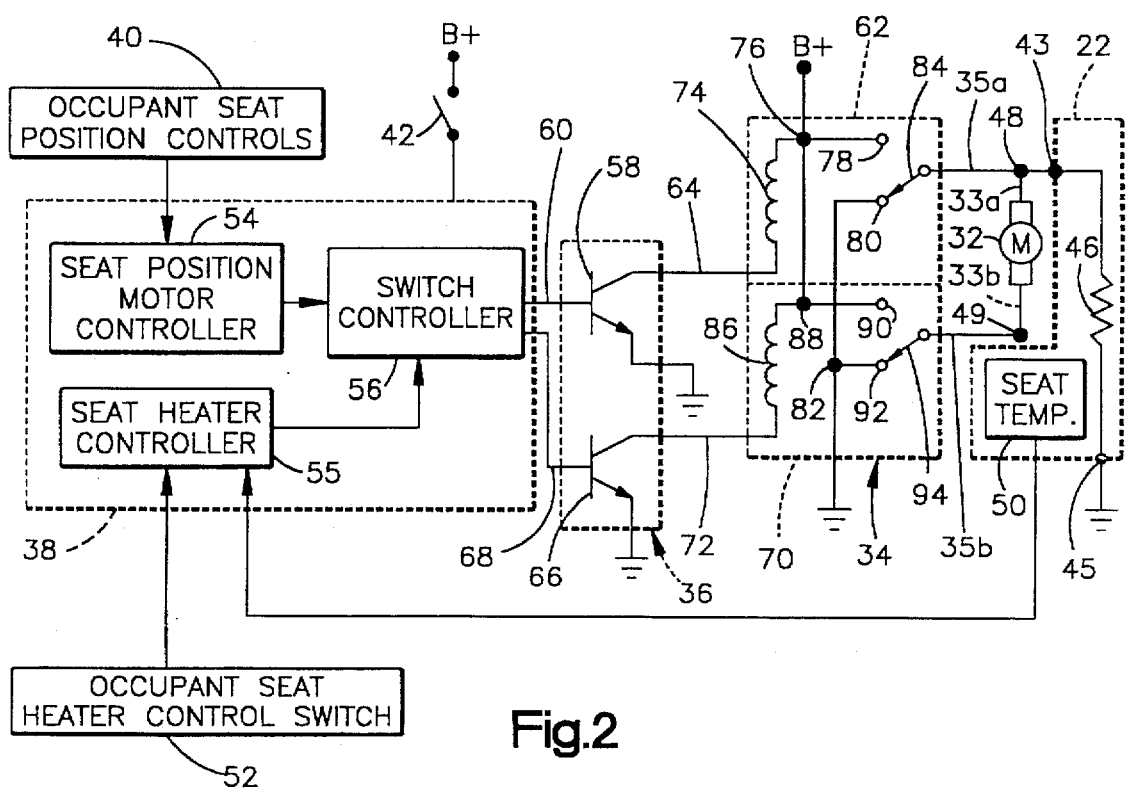
FIG. 2 is a schematic block diagram illustrating the control system of FIG. 1 in further detail.

Referring to FIGS. 1 and 2, an apparatus 20, made in accordance with the present invention, is shown for controlling position and temperature of an occupant seat 22 in a vehicle. Seat 22 includes a seat back 24 and a seat bottom cushion 26. The seat 22 is slidably mounted to a rail 28 in a manner well known in the art. Rail 28 is mounted to the vehicle floor 30. A seat fore/aft position motor 32 is operatively connected to seat 22 so as to adjust the fore and aft position of seat 22 on rail 28. Motor 32 is a motor capable of bi-directional rotation. Additional motors and relays may be operatively connected to seat 22 to adjust other seat positions, e.g. seat height and seat tilt.

Occupant seat position controls 40 are mounted for easy access by the seat's occupant and are operatively connected to a controller 38. Preferably, controller 38 is a microcomputer having internal memories, timers, etc. as is well known in the art. Controller 38 is electrically connected to a source of electric energy B+ through a distribution bus (not shown) and a vehicle ignition switch 42.

Occupant seat position controls 40 are typically rocker switches that are used by an occupant to provide a command signal to controller 38 to adjust the fore/aft position of vehicle seat 22 along rail 28. Seat position controls 40 are controllably connected to seat position controller function 54 of controller 38 and provide command signals thereto. Seat position controller function 54 provides control signals to a switch controller function 56 of controller 38 in response to the electrical signals from the seat position controls 40.

The switch controller function 56 of controller 38 is controllably connected to a plurality of actuation switches 36. Preferably, actuation switches 36 include transistor switches 58, 66. Actuation switches 36 are electrically connected to relays 34 for control thereof. Relays 34 are used to operatively connect or disconnect motor 32 from the source of electrical energy B+. Specifically, switch controller function 56 of controller 38 is controllably connected to the base of transistor switch 58 through line 60. The emitter of transistor switch 58 is electrically connected to vehicle electrical ground. The collector of transistor switch 58 is electrically connected to a relay 62 of relays 34 through line 64. Switch controller function 56 is controllably connected to transistor switch 66 through line 68. The emitter of transistor switch 66 is electrically connected to vehicle electrical ground. The collector of transistor switch 66 is electrically connected to relay switch 70 of relays 34 through line 72.

A seat heater 44 is mounted in the seat bottom cushion 26 of occupant seat 22. Seat heater 44 has a resistive heating element 46. A terminal 43 of resistive element 46 is electrically connected to relay 62. The other terminal 45 of resistive heating element 46 is connected to vehicle electrical ground. Resistive heating element 46 of seat heater 44 generates heat when electrical current flows from the source of electrical energy B+ through resistive element 46 to electrical ground. The generated heat raises the temperature of seat bottom cushion 26. A seat heater may also be located in seat back 24. An occupant seat heater control switch 52 is electrically connected to seat heater controller function 55 of controller 38. Seat heater control switch 52 is mounted within easy access of the occupant and is used by an occupant to control energization of the seat heater 44.

A seat temperature sensor 50 is operatively mounted in seat bottom cushion 26. Seat temperature sensor 50 is electrically connected to the seat heater controller function 55 of controller 38 and provides an electrical feedback signal indicative of the temperature of seat bottom cushion 26. The signal indicative of seat bottom cushion temperature is used by seat heater controller 55 to control the electrical current applied to resistive element 46.

Switch controller function 56 provides control signals to selectively actuate transistors 58, 66 in response to control signals provided to switch controller function 56 by (i) seat position controller function 54, and (ii) a seat heater controller function 55. The control signals from switch controller 56 selectively actuate transistor switches 58, 66 and thereby control relays 34.

Relays 34 are arranged in an H-Bridge configuration to control the direction of rotation of motor 32 and, in turn, the fore/aft position of seat 22. Relay switch 62 includes a relay coil 74 electrically connected to a source of electrical energy B+ at a junction 76. The other end of relay coil 74 is electrically connected to the collector of transistor 58 through line 64.

Relay switch 62 further includes a two position relay switch having (i) a HIGH switch terminal 78 electrically connected to the source of electrical power B+ through junction 76, and (ii) a LOW switch terminal 80 electrically connected to vehicle electrical ground through a junction 82. A movable switch contact 84 electrically connects a relay output line 35a to either the HIGH terminal 78 or the LOW terminal 80. Movable switch contact 84 is resiliently biased to contact the LOW terminal 80 when relay coil 74 is not energized. When transistor switch 58 is switched ON thereby causing current to flow through relay coil 74, movable switch contact 84 contacts the HIGH terminal 78. Output line 35a of relays 34 is electrically connected to a junction 48. Junction 48 is electrically connected to a motor terminal 33a of motor 32.

Relay switch 70 includes a relay coil 86 electrically connected to the source of electrical energy B+ at a junction 88 which is, in turn, electrically connected to junction 76. The other end of relay coil 86 is electrically connected to the collector of transistor 66 through line 72.

Relay switch 70 is a two position relay switch having (i) a HIGH switch terminal 90 electrically connected to the source of electrical energy B+ through junction 88, and (ii) a LOW switch terminal 92 electrically connected to vehicle electrical ground through junction 82. A movable switch contact 94 electrically connects a relay output line 35b to either the HIGH terminal 90 or the LOW terminal 92. Movable switch contact 94 is resiliently biased to contact the LOW terminal 92 when relay coil 86 is not energized. When transistor switch 66 is switched ON thereby causing current to flow through relay coil 86, movable switch contact 94 contacts the HIGH terminal 90. Output line 35b of relays 34 is electrically connected to a junction 49. Junction 49 is electrically connected to a motor terminal 33b of motor 32. One skilled in the art will appreciate that other types of transistors or controllable switches may be used for actuation switches 36.

Referring specifically to FIG. 2, the operation of the present invention will be better appreciated. The occupant seat position controls 40 typically include a plurality of rocker switches that the seat occupant presses to indicate his desire to move the seat. When an occupant operates the occupant seat position controls 40 to adjust the position of seat 22, an electrical signal indicative of the desired direction of seat movement is provided to seat position controller function 54 in controller 38. Seat position controller 54 provides a control signal to switch controller 56 indicating which transistor switch 58 or 66 to turn ON to rotate motor 32 in the desired direction.

When switch controller 56 actuates transistor switch 58 to the ON condition, electrical current flows to vehicle electrical ground from junction 76, through relay coil 74, and transistor 58, thereby energizing relay coil 74. Transistor 66 is maintained OFF. When relay coil 74 is energized, moveable switch contact 84 is moved from its normally biased position, i.e. the LOW terminal 80, into electrical contact with the HIGH switch terminal 78. Electrical current then flows through moveable switch contact 84 to junction 48, through motor 32, through junction 49, and through moveable switch contact 94 to the vehicle electrical ground. This current flow through motor 32 causes the motor to rotate in a first direction thereby moving the seat 22 in a first direction.

To move seat 22 in the opposite direction, the occupant uses seat position controls 40 to provide the appropriate electrical signal to seat position controller 54. Seat position controller 54 provides a control signal to switch controller 56 which, in turn, actuates transistor switch 66 to the ON condition while maintaining switch 58 OFF. When switch controller 56 turns transistor switch 66 ON, electrical current flows to vehicle electrical ground from junction 76 through junction 88, relay coil 86, and transistor 66, thereby energizing relay coil 86. When relay coil 86 is energized, moveable switch contact 94 is moved from its normally biased position, i.e. the LOW terminal 92, into electrical contact with the HIGH switch terminal 90. Electrical current flows through moveable switch contact 94 to junction 49, through motor 32, through LOW switch terminal 80, through junction 82 to vehicle electrical ground. Current flow through motor 32 in this direction causes the motor to rotate in its second direction which, in turn, moves the seat 22 in a second direction.

An occupant uses seat heater switch 52 to provide an electrical signal to seat heater controller 55 to energize seat heater control switch 44. Seat heater controller 55 provides a control signal to switch controller 56 to simultaneously actuate both transistor switch 58 and transistor switch 66 to ON conditions. When both transistor switches 58, 66 are simultaneously actuated ON, relay coils 74, 86 are both energized. When relay coils 74, 86 are both energized, moveable relay contacts 84, 94 each move into electrical contact with their respective HIGH switch terminals 78, 90 from their normally biased position LOW terminals 80, 92. In other words, movable switch contact 84 is in electrical contact with HIGH terminal 78 and moveable switch contact 94 is in electrical contact with HIGH switch terminal 90. Junctions 48 and 49 are biased at the same HIGH voltage so that terminals 33a, 33b, of motor 32 have no appreciable difference in voltage. Since the same voltage is applied to both terminals 33a, 33b of motor 32, there is no voltage differential supplied to the motor windings and the motor is not energized to rotate in either direction.

However, with both transistor switches 58, 66 ON, electrical current flows through resistive element 46 of seat heater 44, thereby heating seat bottom 26. Seat heater controller 55 regulates the average power supplied to seat heater 44 by pulse-width-modulating transistor switches 58, 66 in response to the seat temperature sensed by sensor 50.

Seat temperature sensor 50 provides an electrical signal indicative of the temperature of seat bottom 26 to seat heater controller 55. The seat temperature signal from sensor 50 is compared with a predetermined seat temperature value. The pulse-width-modulation of switches 58, 66 is controlled accordingly. When transistor switches 58, 66 are OFF, relay switches 62 return their respective moveable switch contacts 84, 92 to their normally biased positions and electrical current does not flow through seat heater 44 nor through the motor 32. If it is desirable to move the seat while the seat heater switch is actuated, the motor control operation of switches 58, 66 overrides the heater control operation. In effect, switches 58 and 66 are turned ON and OFF so as to move the seat.

Those skilled in the art will appreciate that when the switches 58, 66 are controlled so as to actuate motor 32, the seat heater 46 is energized. Since the thermal time constant of the seat heater is relatively long and the operation of the seat motor 32 during seat repositioning is relatively short, seat repositioning will not result in a perceivable change in seat temperature. Also, if the seat is moved while the seat heater switch 52 is actuated ON, the momentary continuous current flow through heater 46 (as opposed to pulse-width-modulation control) while the seat is moved will not result in a perceivable temperature change in the seat.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling a seat positioning motor and a seat heater of the seat, said apparatus comprising:
   common switching means electrically connected to both said motor and said seat heater for selectively connecting one or more of said motor and said seat heater to a source of electric energy; and
   control means controllably connected to said common switching means for controlling said common switching means to, in one switched condition, actuate both said motor, in a first direction, and said seat heater, and, in a second switched condition, actuate only one of said seat heater and said motor.

2. An apparatus for controlling a seat positioning motor and a seat heater of the seat, said apparatus comprising:
   common switching means electrically connected to both said motor and said seat heater for selectively connecting one or more of said motor and said seat heater to a source of electrical energy, wherein said common switching means comprises a first relay switch and a second relay switch, each operatively connected to both first and second terminals of said source of electrical energy, said first relay switch further connected to one terminal of said motor and one terminal of said seat heater and said second relay switch further connected to another terminal of said motor; and
   control means controllably connected to said common switching means for selectively controlling actuation of one or more of said motor and said seat heater through said common switching means.

3. The apparatus of claim 2 wherein said common switching means further includes a first switching transistor and a second switching transistor operatively connected to said first relay switch and said second relay switch, respectively.

4. An apparatus for controlling a seat positioning motor and a seat heater of the seat, said apparatus comprising:
   common switching means electrically connected to both said motor and said seat heater for selectively connecting one or more of said motor and said seat heater to a source of electric energy, said common switching means comprising a first relay switch for controllably connecting one terminal of said motor and one terminal of said seat heater to said source of electrical energy and to electrical ground, a second terminal of said seat heater being continuously connected to electrical ground, and a second relay switch for connecting a second terminal of said motor to said source of electrical energy and to electrical ground, a first switching transistor and a second switching transistor operatively connected to said first relay switch and said second relay switch, respectively, for control of said first and second relay switches; and
   control means controllably connected to said first and second switching transistors for selectively controlling actuation of one or more of said motor and said seat heater using said common switching means, said control means including seat position control switches and heater control switches, said control means controlling said first and second switching transistors in response to said seat position control switches and said heater control switches so as to selectively (i) not connect either said motor and said seat heater across said source of electrical energy, (ii) connect only a selected one of said seat heater and motor across said source of electrical energy, and (iii) connect both said seat heater and said motor across said source of electrical energy through said first and second relay switches.

5. The apparatus of claim 4 further including means for sensing temperature of said seat and wherein said control means further includes means for controlling temperature of said seat heater in response to the sensed temperature of said seat.

6. A method for controlling a seat positioning motor and a seat heater of the seat, said method comprising the steps of:
   providing common switching means to permit a selected connection of one or more of said motor and said seat heater to a source of electrical energy; and
   controlling said common switching means to provide one switched condition for actuating both of said motor and said seat heater using said common switching means and controlling said common switching means to provide a second switched condition for actuating only one of said seat heater and said motor.

7. The apparatus of claim 1 wherein said control means further controls said common switching means to, in a third switched condition, not actuate either said motor and said seat heater, and, in a forth switched condition, actuate said motor in a second direction.

8. An apparatus for controlling a seat positioning motor and a seat heater of a seat, said apparatus comprising:
   a first relay switch for controllably connecting a first terminal of said motor and a first terminal of said seat heater to a source of electrical energy and to electrical ground, a second terminal of said seat heater connected to electrical ground;
   a second relay switch for connecting a second terminal of said motor to said source of electrical energy and to electrical ground;
   a first switching transistor operatively connected to said first relay switch to control said first relay switch;
   a second switching transistor operatively connected to said second relay switch to control said second relay switch; and
   a controller controllably connected to said first and second switching transistors for selectively controlling actuation of one or more of said motor and said seat heater using said first and second relay switches, said controller operatively coupled to a seat position control switch and a heater control switch, said controller controlling said first and second switching transistors in response to said seat position control switch and said heater control switch, whereby the first and second relays provide a common switching means to control both the motor and the seat heater.

9. The apparatus of claim 8 wherein said controller pulse width modulates said first and second switching transistors in response to said heater control switch to thereby control actuation of said seat heater.

* * * * *